United States Patent
Naffziger et al.

(12)

(10) Patent No.: US 6,323,714 B1
(45) Date of Patent: Nov. 27, 2001

(54) SYSTEM AND METHOD FOR DESKEWING SYNCHRONOUS CLOCKS IN A VERY LARGE SCALE INTEGRATED CIRCUIT

(75) Inventors: Samuel D Naffziger; Eugene Z Berta; Gerard M Blair, all of Fort Collins; James Steven Wells, Windsor, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/497,094

(22) Filed: Feb. 3, 2000

(51) Int. Cl.[7] .................. G06F 1/04; H03K 3/00
(52) U.S. Cl. .............. 327/295; 327/158; 327/293; 327/149
(58) Field of Search .................. 327/291, 293, 327/295, 141, 149, 158, 161

(56) References Cited

U.S. PATENT DOCUMENTS

| | | | |
|---|---|---|---|
| 5,101,117 | * 3/1992 | Johnson et al. | 327/149 |
| 5,670,903 | * 9/1997 | Mizuno | 327/158 |
| 5,990,719 | * 11/1999 | Dai et al. | 327/244 |

\* cited by examiner

Primary Examiner—Terry D. Cunningham
Assistant Examiner—Quan Tra

(57) ABSTRACT

A system and method for actively deskewing synchronous clocks in a VLSI circuit by introducing a controllable delay unit within a local clock buffer within each of a number of circuit zones and applying a controllable delay at each of the local clock buffers in response to a phase comparison of clock signals from one or more adjacent clock zones. The system can be added to any of a number of various clock distribution networks on a VLSI circuit through the introduction of controllable clock zone buffers and localized phase comparators. By adjusting each localized clock buffer delay unit in response to measured clock signal phase differences from adjacent circuit zones, clock skew problems can be minimized across various clock zones on a VLSI circuit.

24 Claims, 11 Drawing Sheets

SYSTEM AND METHOD FOR DESKEWING SYNCHRONOUS CLOCKS IN A VERY LARGE SCALE INTEGRATED CIRCUIT

FIELD OF THE INVENTION

The present invention generally relates to synchronous clock distribution in a very large scale integrated (VLSI) circuit, and more particularly, to a system and method for actively controlling synchronous clock skewing in a clock signal distribution network across an entire VLSI circuit.

BACKGROUND OF THE INVENTION

VLSI circuit chips require a clocking scheme in order to execute instructions and transfer data across the many individual smaller circuit components. Ideally, clock signals would arrive at every circuit element within a VLSI circuit simultaneously. As a result, clock distribution networks in VLSI circuits have typically been designed such that the reference clock signal is distributed in a symmetric manner across the circuit from a centrally located clock reference. A balanced "H," a grid, a spine, and a tree are some examples of the physical layout of clock distribution networks across a VLSI chip.

Despite the symmetry associated with prior art clock distribution networks, imperfections in circuit conductors and clock signal repeaters, lead to random variations across the clock distribution network on a VLSI chip. These random variations introduced by flaws in manufacturing processes introduce clock skew. Clock skew is further affected by the different logic blocks implemented on a VLSI circuit. Since logic blocks perform different functions, it follows that each logic block is implemented with a different circuit stricture. Thus, during operation, the path taken in any given logic block varies from block to block. Different capacitive and resistive loads caused by the various logic elements also affect clock skew. In other words, different logic circuits and variations within the elements from logic block to logic block make it nearly impossible to match the rising and falling edges of different clocks across each individual logic block on a VLSI circuit.

Early generations of VLSI circuits used a single clock with a 50% duty cycle. Only a single operation could be performed during each individual clock cycle. As higher clock frequencies became not only desirable, but required, various schemes were employed to increase the allowable frequency of the clock cycle, for example, altering the duty cycle to increase the enable phase and to decrease the disable phase while maintaining the smallest possible clock period. A clear problem with this method was that the maximum allowable clock frequency was limited to the setup and hold time requirements of the individual physical components on the VLSI circuit. Other methods were needed to increase clock frequency.

One method for permitting greater clock frequency is known as "pipelining." In this method, a dual phase clock scheme is used by generating a differential pair of symmetric clocks in a centralized region of the VLSI circuit. In a simple "pipeline" configuration, logic for implementing operations is divided into specific "pipeline" stages, whereby each stage represents one clock cycle. Alternating stages receive the differential clock signals. Thus, while a given pipeline stage performs an operation during an enable phase, the subsequent pipeline stage, which depends on the output from the previous stage, waits during its disable cycle. As one of the differential clocks enters the disable cycle, the other differential clock enters the enable cycle, and the subsequent pipeline stage performs its designated operation.

Since typical pipelined clocking schemes generally use global clocks and a clock distribution network to apply the global clock to localized circuit blocks across the VLSI circuit, clock skew and the rise and fall times of the clocking signals received by each individual circuit blocks on a VLSI circuit are critical to circuit performance.

Clock skew reduces circuit performance by introducing race conditions and hold time problems. Race conditions occur when a first latch designed to maintain a data signal at a particular level for sampling by a circuit in a second clock zone on the VLSI circuit transitions prior to the sampling event. Race conditions introduce data transfer errors when the receiving circuit applies incorrect data. In a related manner, clock skew introduces hold time problems as clock signal delays at a data sending circuit reduce the time available for a data signal to reach a receiving circuit in a second clock zone. As a result of clock skew, the VLSI circuit can not be run as fast as intended. Clock skew is a function of load, clock network distribution across the dice and device mismatch, as well as, temperature and voltage gradients across the VLSI circuit.

Thus, a need exists in the industry to control clock skew between logic blocks across a VLSI circuit.

SUMMARY OF THE INVENTION

It is thus an object of the present invention to actively control clocks across the different individual circuits on a VLSI circuit chip by eliminating clock skew.

These and other objectives are accomplished by the system and method of the present invention. Each local circuit within a VLSI circuit is provided with a local clock via a clock distribution network. A local clock buffer strengthens and further distributes a clock signal within its local circuit. The present invention provides a system and method for actively deskewing synchronous clocks in a VLSI circuit by introducing a controllable delay unit at each local clock buffer.

Briefly described, in architecture, the system can be added to any of a number of various clock distribution networks on a VLSI circuit through the introduction of controllable clock zone buffers and phase comparators. By actively adjusting each localized delay unit in response to measured clock phase differences from adjacent circuit zones, clock skew problems can be minimized across clock zones on a VLSI circuit.

The present invention can also be viewed as providing a method for actively controlling clock skew across the individual logic blocks of a VLSI circuit chip. In this regard, the method can be broadly summarized by the following steps. First, providing a synchronous clock to each of a plurality of clock zones. Second, introducing a controllable delay element within the local clock buffer in each of the plurality of clock zones. Third, comparing the phase of two or more zone clock signals from adjacent zones to create a control signal. Fourth, using the control signal to adjust the delay element in a particular clock zone in response to the phase comparison result. Last, repeating the steps of comparing clock signals and adjusting clock buffer delays during each clock cycle across the VLSI circuit.

In a preferred embodiment, the steps of comparing and adjusting clock delays are referenced from a centrally located reference clock so that the reference clock is distributed across each of the clock zones in a "tree" topology. In this embodiment, the first level phase comparisons resemble branches with the centrally located clock reference representing the trunk. As the process steps of comparing and adjusting progress, each phase comparison of local adjacent clocks branches further from the trunk of the tree. In the "tree" topology, each clock zone signal is compared with at least one clock signal from an adjacent clock that is more proximate to a centrally located reference clock.

In another preferred embodiment, the step of comparing the phase of clock signals is performed across a number of adjacently located clock zones with each individual clock zone adjusted in response to comparisons with clock signals from two or more adjacent clock zones. This "regional" or "hierarchical" approach to clock zone delay adjustment has the property that each particular clock zone not only has a direct impact on the delay adjustment for adjacent clock zones, but the adjacent clock zones, also impact the ultimate delay correction for each of their adjacent clock zones as well.

In a configuration well known in the prior art, a clock signal from one of the clock zones furthest removed from the centrally located reference clock (both embodiments) is used as a feedback signal for a phase-locked loop (PLL) within the VLSI circuit reference clock. In this way, the VLSI circuit reference clock is informed as to how well the VLSI circuit clock is tracking an external input clock signal.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

A circuit and method for actively deskewing synchronous clocks across multiple logic circuit blocks on a VLSI circuit chip are disclosed. The following description, for purposes of explanation, sets forth the invention in specific terms and illustrates details of control algorithms to provide an understanding of the present invention. However, it will be apparent to one skilled in the art that these specific details are not required in order to practice the present invention.

CLOCK SIGNAL DISTRIBUTION

Figure 1:
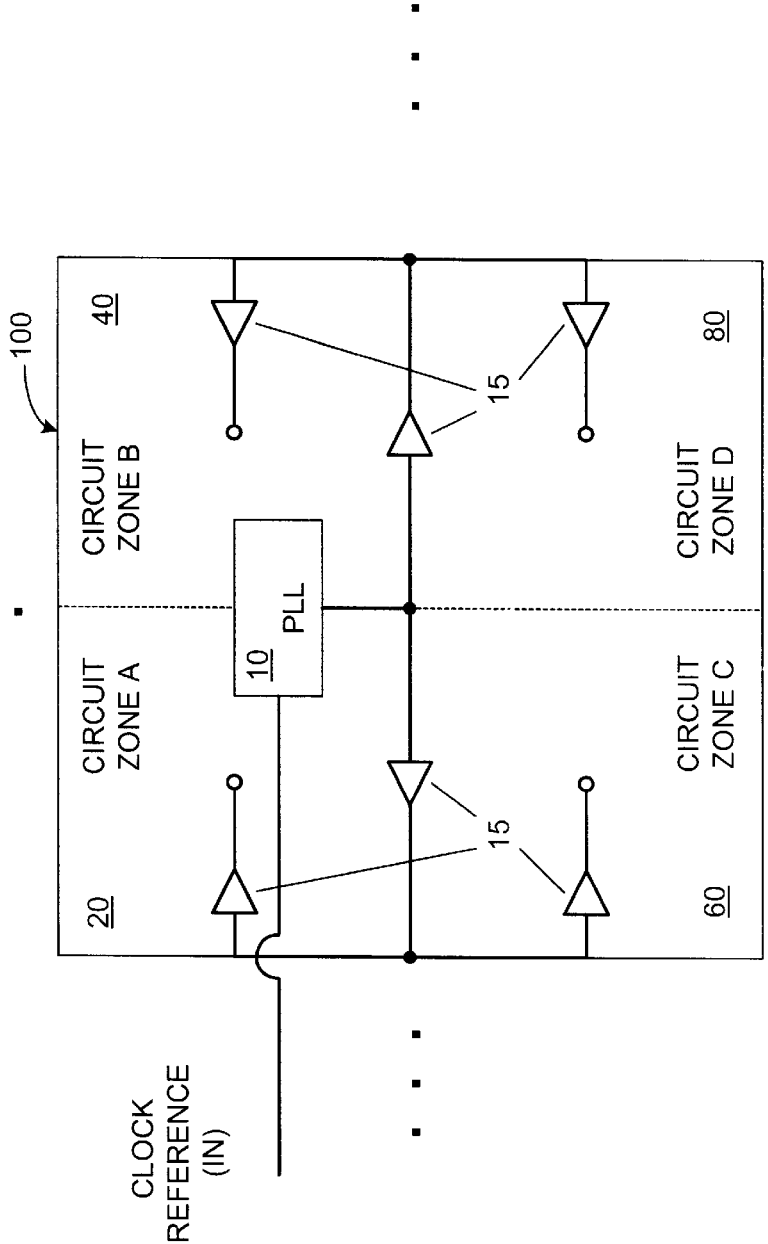
FIG. 1 illustrates a high-level block diagram of a prior art VLSI circuit containing local circuit zones and a clock distribution network.

FIG. 1 illustrates a prior art high-level block diagram of a VLSI circuit with a clock distribution network containing local circuit zones radiating from a centrally located reference clock. An external clock reference signal driven by a crystal or other means is introduced into the integrated circuit 100 via phase locked loop circuit 10. The clock reference is then distributed and buffered by a plurality of clock drivers 15 to circuit zones A, B, C, and D 20, 40, 60, and 80 distributed across the integrated circuit 100. Each of the circuit zones A, B, C, and D 20, 40, 60, and 80 comprise a circuit zone specific clock driver 15 to strengthen the clock line signal in order to drive a large fan out of local logic circuits within each zone. Each of the circuit zones A, B, C, and D 20, 40 60, and 80 provides some functionality for the integrated circuit.

Within a digital integrated circuit, data is often shared between the various circuit zones A, B, C, and D 20, 40, 60, and 80. The various local circuit zones may be interconnected at defined data input and output lines. In a VLSI circuit, the clock signals must travel various distances in order to reach a particular circuit zone. The clock signals then travel through the different logic circuits within the various circuit zones. It is during this distribution that clock signals within the various circuit zones A, B, C, and D 20, 40, 60, and 80 become skewed.

If a data signal from one circuit zone, driven from a clock from a first clock line in the clock distribution network is sent to a second circuit zone that is clocked from a second clock line in the clock distribution network that is skewed from the first clock line, then the data signal may be clocked too early or too late. For example, if the clock line from the second circuit zone is delayed more than the clock line from the first circuit zone then the data signal from the first circuit zone will be generated and removed before the second circuit zone is able to sample the data. This condition is commonly known as a race condition.

Figure 2:
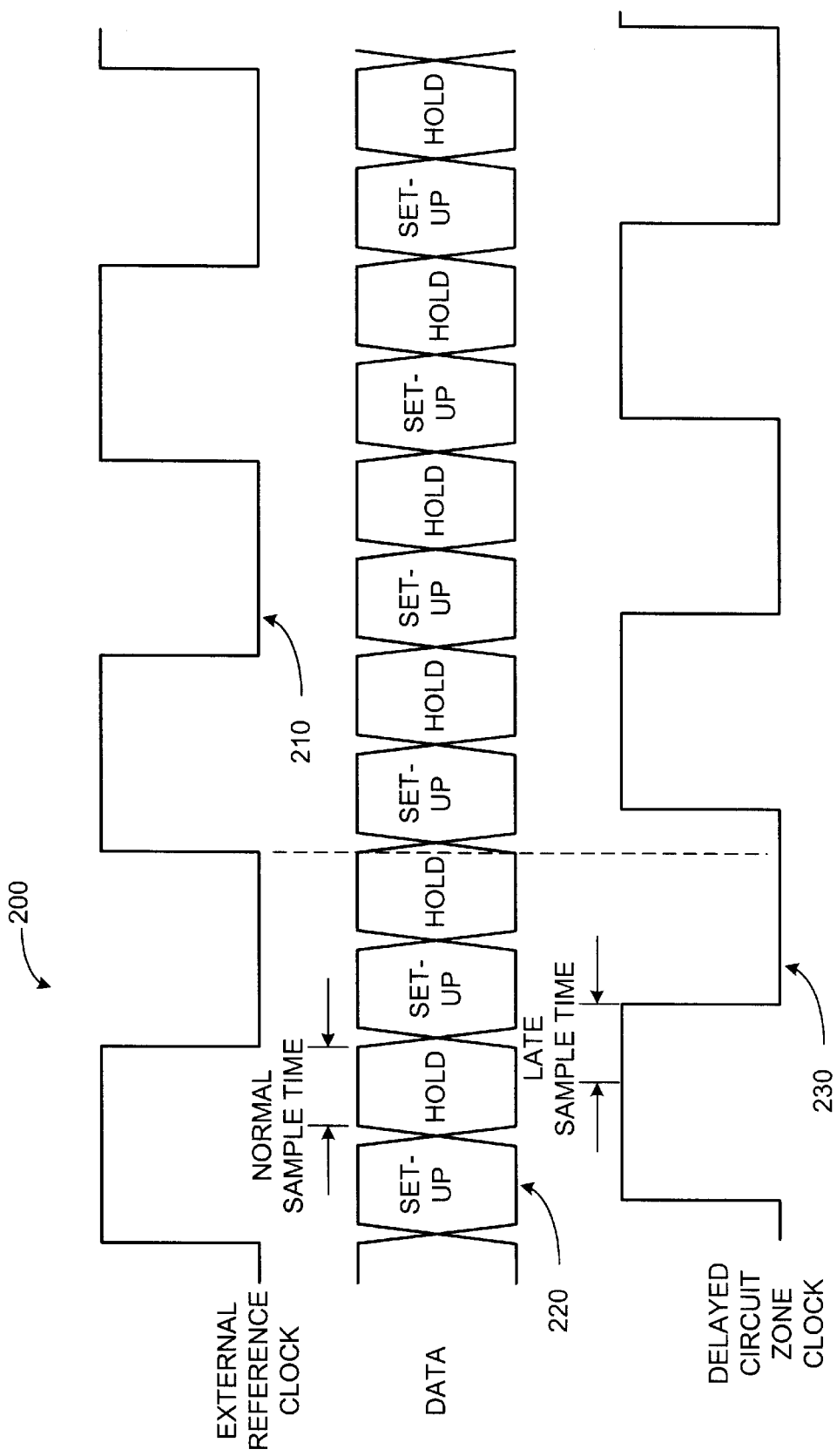
FIG. 2 is a timing diagram illustrating the timing relationships between a data signal, an external reference clock, and a delayed circuit zone clock as might be applied by the clock distribution network at one of the local circuit zones of the VLSI circuit of FIG. 1.

FIG. 2 illustrates a timing relationship 200 between a data signal, an external reference clock, and a delayed circuit zone clock where a race condition exists between local circuit zones of the VLSI circuit of FIG. 1. In this regard, external reference clock 210 represents a normal clock signal. In an ideal situation, each clock signal applied within the various circuit zones A, B, C, and D 20, 40, 60, and 80 illustrated in FIG. 1 would reflect the same amplitude, frequency, and all leading and falling edges would appear concurrently across the VLSI circuit. In FIG. 2, data signal 220 represents a data signal that is synchronized to the external reference clock 210. Data signal 220 is generated during the first half of each clock phase, this is referred to as the "set-up" period. During the second half of each clock phase, the data signal 220 can be sampled, this is referred to as the "hold" period. In FIG. 2, the delayed circuit zone clock 230 is significantly delayed from the external reference clock 210. If the delayed circuit zone clock 230 were applied at a data receiving circuit zone incorrect data would be applied to the local logic circuits. As illustrated in FIG. 2, a receiving circuit that applies the delayed circuit zone clock 230 samples the data signal 220 too late. As a result, the VLSI circuit would not function properly.

AN IMPROVED CIRCUIT ZONE CLOCK BUFFER

Figure 3:
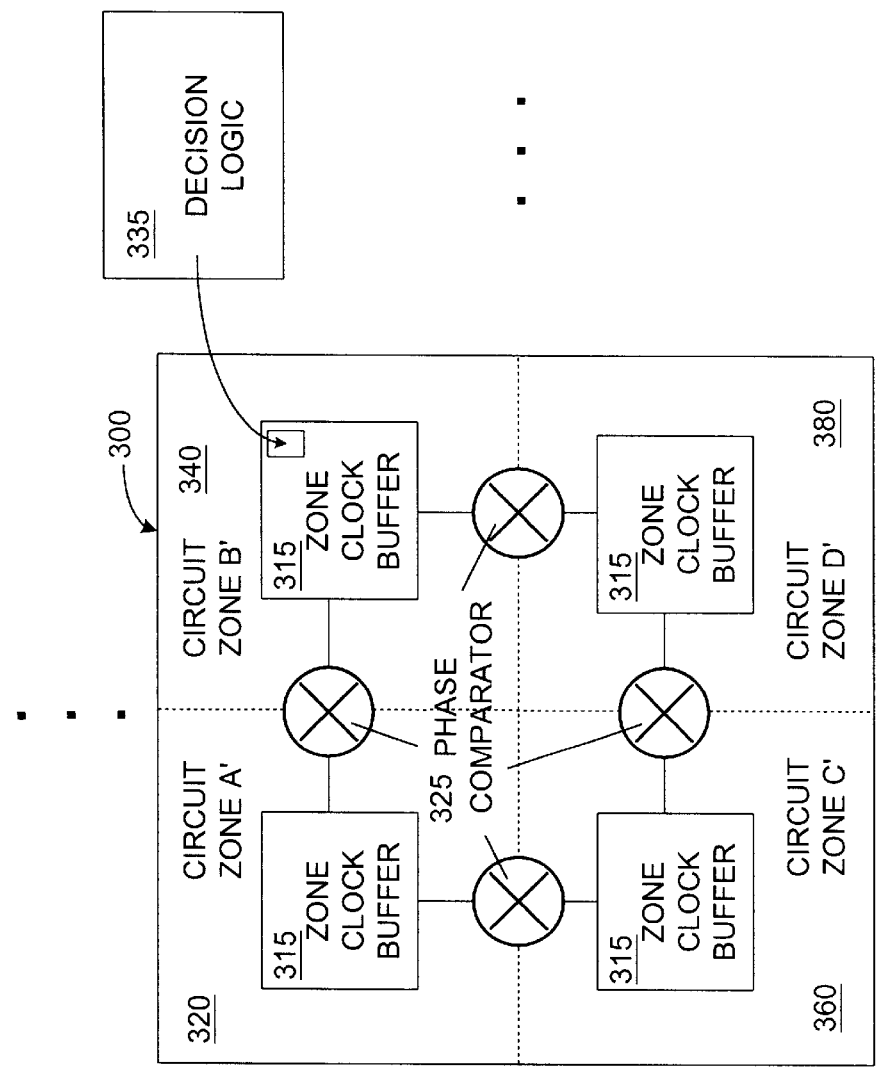
FIG. 3 illustrates a high-level block diagram of the VLSI circuit of FIG. 1 further configured with local circuit zones each with a zone clock buffer and a plurality of phase comparators located at the intersections between circuit zones.

The present invention provides a circuit and method for actively introducing a variable delay or skew into the various circuit zone clocks such that the various localized clock signals across the VLSI circuit are synchronized. FIG. 3 illustrates a local area of a VLSI circuit 300 divided into circuit zones A', B', C', and D' 320, 340, 360, and 380 each of which comprises a zone clock buffer 315. For simplicity, the clock distribution network (see FIG. 1) is not illustrated. Each of the zone clock buffers 315 shown in FIG. 3 are in communication with at least one localized phase comparator 325 located at a clock distribution network intersection between adjacent circuit zones. Each of the zone clock buffers 315 may contain decision logic 335 (For simplicity, decision logic 335 is illustrated in association with zone clock buffer 315 in circuit zone B' 340 only.) The decision logic 335 may be configured to receive phase comparator 325 output signals responsive to which of the two circuit zone clocks leads the other.

For example, if circuit zone B' 340 is physically closer to a reference clock location on the VLSI circuit, decision logic 335 may be configured to compare clock signals sampled from the zone clock buffers 315 in circuit zone A' 320 and circuit zone B' 340 using the clock signal from circuit zone B' 340 as a reference. If the circuit zone clock from circuit zone A' 320 leads the reference clock, decision logic 335 may be configured to provide a control signal indicating an increase in the clock delay for circuit zone A' 320 is desired. Conversely, if the circuit zone clock from circuit zone A' 320 lags the reference clock, decision logic 335 may be configured to provide a control signal indicating a decrease in the clock delay for circuit zone A' 320 is desired. It is important to note that circuit zone clock comparison and adjustment may be simultaneously performed between adjacent circuit zones during each clock cycle across the entire VLSI circuit. Having described the present invention in broad terms with regard to FIG. 3, reference is now directed to FIG. 4.

Figure 4:
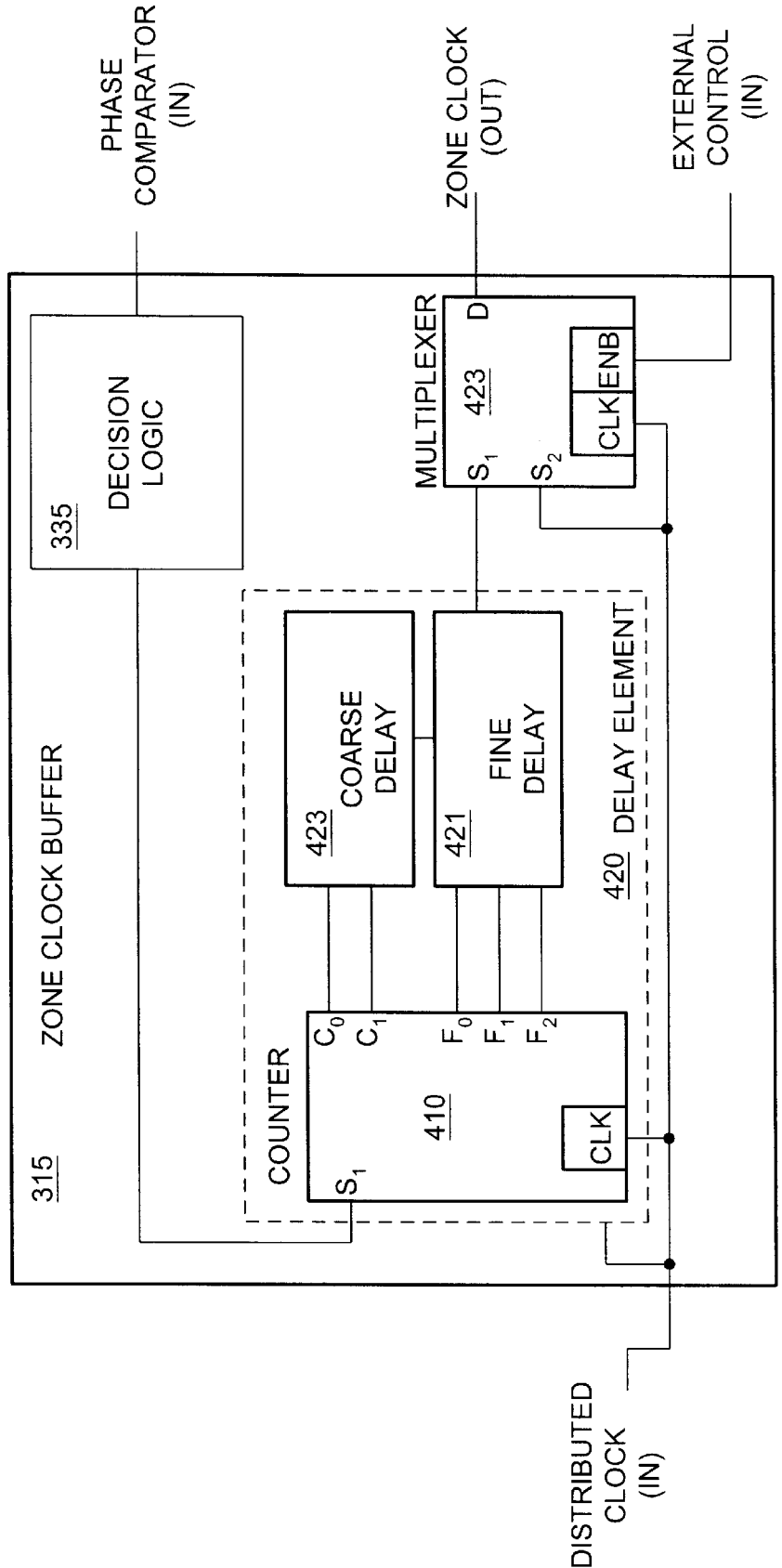
FIG. 4 illustrates a functional block diagram of the zone clock buffer of FIG. 3.

FIG. 4 illustrates a functional block diagram of the zone clock buffer 315 shown in FIG. 3. The zone clock buffer 315 comprises a delay element 420, a multiplexer 423, and decision logic 335. The delay element 420 consists of a counter 410, a coarse delay 423 and a fine delay 421. Both the coarse delay 423 and the fine delay 421 may be implemented by a number of known configurations. In the preferred embodiment, the fine delay element 421 is a 3-bit circuit consisting of current starved transistors in a parallel configuration. The coarse delay element is a 2-bit circuit consisting of a multiplexer and a series of inverter pairs. The multiplexer in the coarse delay element configured to receive its input from the appropriate output location along the line of inverter pairs. Both these and other delay elements are well known by those skilled in the art and need not be illustrated and described in order to understand the present invention.

The clock zone buffer 315 receives both a distributed clock from the clock distribution network and a phase comparator input signal from the phase comparator 325 (see FIG. 3). The phase comparator input signal is received and processed in decision logic 335.

In order to improve stability, the output of the phase comparator may be passed through a three-stage filter (not shown) such that phase comparator outputs are applied to counter 410 only after the three-stage filter receives three consecutive values that agree. In this regard, the three-stage filter serves to remove high-frequency variations in the control signal thereby avoiding metastable conditions. Stability may be further ensured by limiting the delay duration applied with each clock zone delay adjustment to less than the average clock zone phase difference expected between clock zones on a VLSI circuit.

Counter 410 may be a simple 5-bit synchronous up-down counter. The 5-bit output may be applied to delay element 420 such that delay element 420 comprising coarse delay 423 and fine delay 421 delays the leading edge of the zone clock signal by a duration corresponding to the 5-bit input signal. Multiplexer 423 may be included in the zone clock buffer 315 to permit an external control to apply either the distributed clock or the delayed clock for the zone clock output signal.

Figure 5:
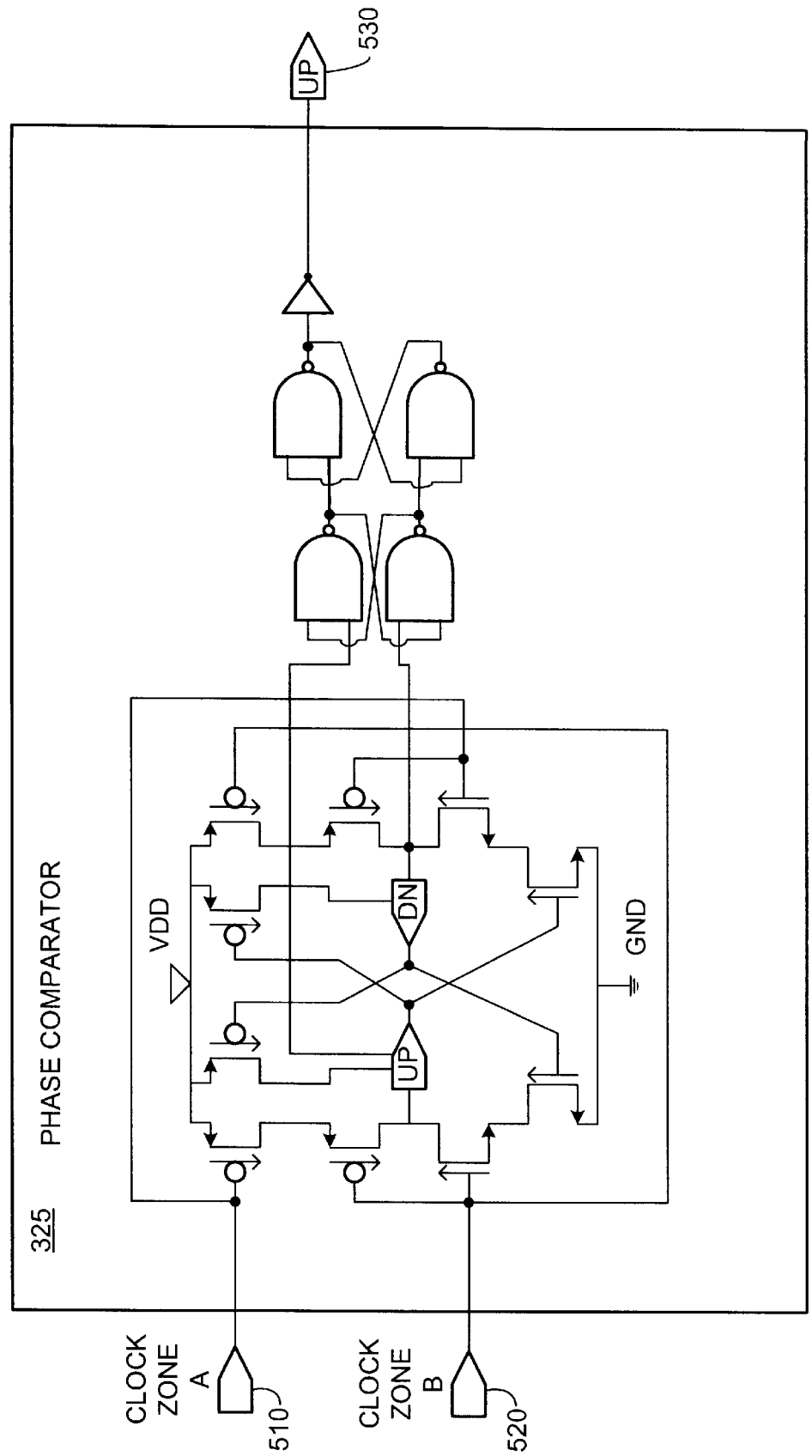
FIG. 5 shows a circuit diagram of the phase comparator of FIG. 3.

Having described the zone clock buffer 315 of FIG. 4, reference is now directed to FIG. 5. In this regard, FIG. 5 shows a circuit diagram of the phase comparator of FIG. 3. It is important to note that the circuit illustrated in FIG. 5 is only an example of any of a number of phase comparators consistent with the concepts of the present invention.

The phase comparator 325 illustrated in FIG. 5 comprises three elements: an arbiter and two-pair of cross-coupled NOR gates. The arbiter has the property that if its clock zone A and clock zone B inputs 510, 520 are both zero, its outputs are both one. When the first input rises, the corresponding output falls and locks the arbiter until both inputs are again zero.

Two SR flip-flops provide a latching mechanism for the arbiter's outputs so that the output of the phase comparator 325 is changed at most once in a clock period. Further, while metastable outputs from the arbiter are possible, the two SR flip-flops prevent propagation of the metastable condition. Only a delayed transition may result from a metastable event.

The output signal 530 from the phase comparator 325 is a single signal to indicate either an up or not-up (down) command to the counter 410 (see FIG. 4).

Figure 6:
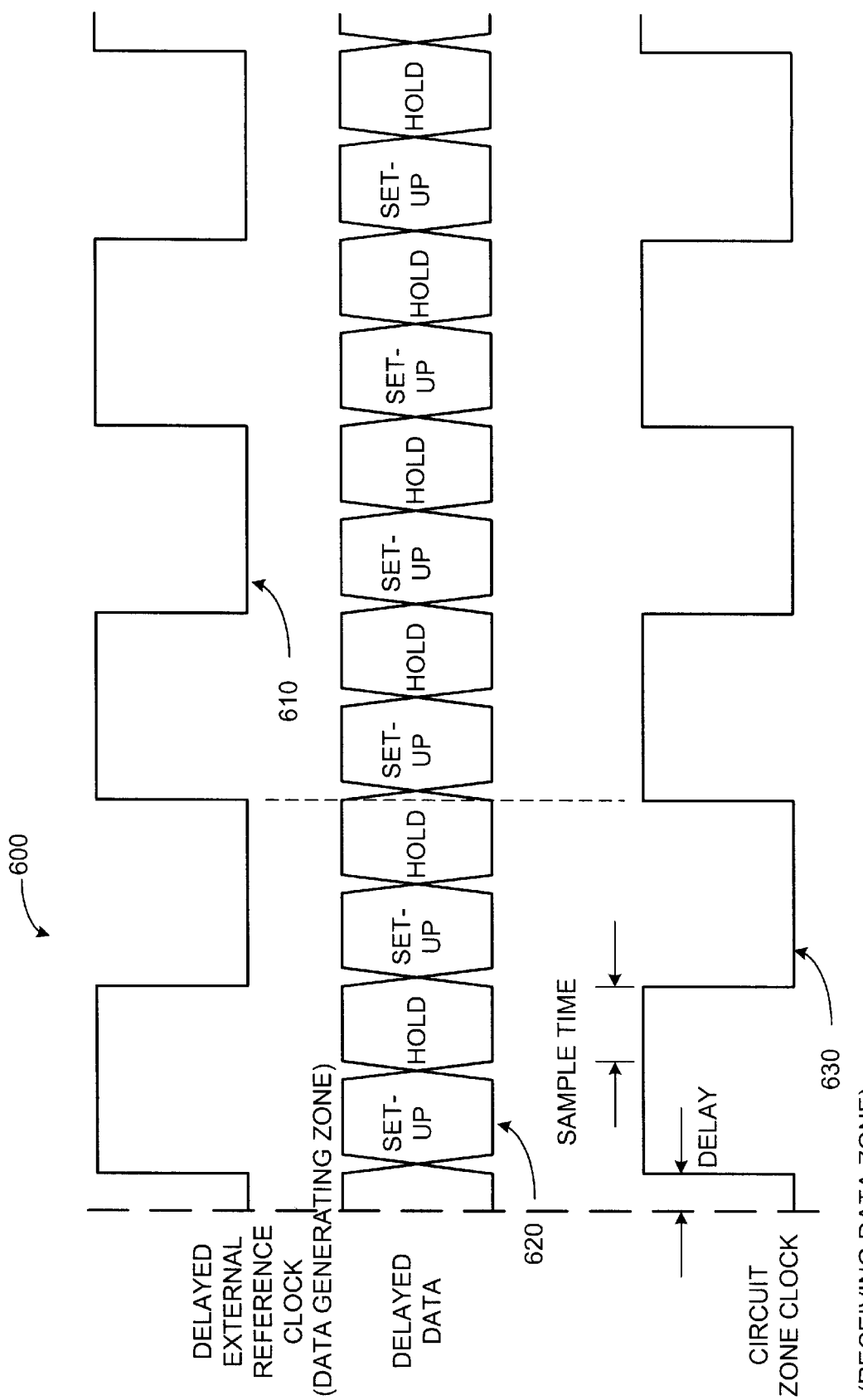
FIG. 6 is a timing diagram illustrating the timing relationships between a circuit zone clock at a zone receiving data, a delayed circuit zone clock (as applied at a data generating zone), and a delayed data signal as might be found within the circuit zones of the VLSI circuit of FIG. 3.

Having described operation of the phase comparator 325 in FIG. 5, reference is now directed to FIG. 6. FIG. 6 is a timing diagram illustrating a corrected timing relationship 600 between a data generating zone clock 610 (delay applied), a delayed data signal 620, and a delayed circuit zone clock (receiving data zone) 630 as might be found within circuit zones of the VLSI circuit of FIG. 3. In this regard, FIG. 6 illustrates how a local zone clock buffer 315 (not shown) of the present invention can be used to correct a race condition.

As illustrated in FIG. 6, the circuit zone clock (receiving data zone) 630 is representative of a delayed circuit zone clock as shown in the timing relationship of FIG. 2. However, in FIG. 6, the reference clock for the data generating circuit zone 610 has been delayed by an unknown duration. The delayed data signal 620 is also delayed since the data generated within a particular circuit zone is synchronized to the reference clock. When the circuit zone clock of the receiving data zone 630 is adjusted such that it substantially aligns with the circuit zone clock of the data generating zone 610 then the data signal 620 will be sampled at the proper time. This situation is illustrated in FIG. 6 where the receiving zone sample time occurs within the hold period of the data signal 620.

ACTIVELY DESKEWING LOCALIZED CIRCUIT ZONE CLOCKS

Figure 7:
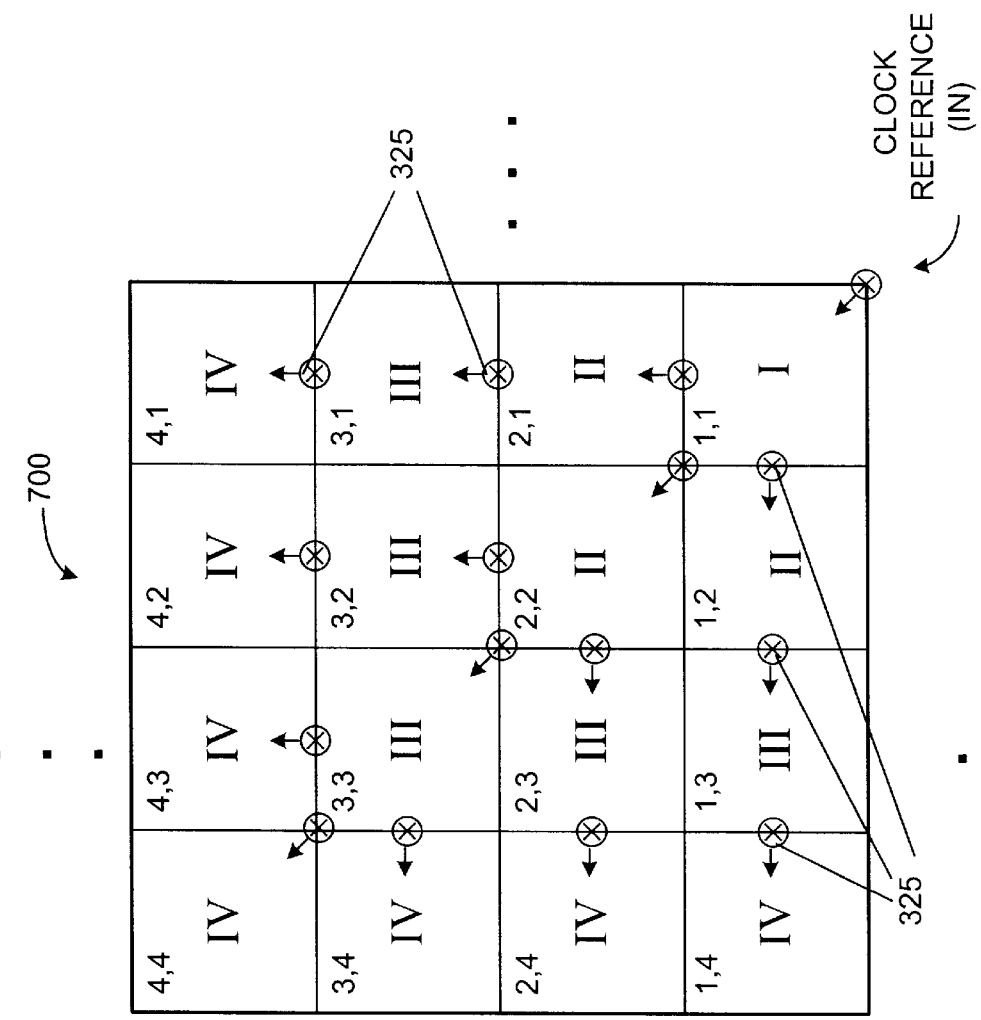
FIG. 7 is a high-level diagram illustrating how a quadrant of the VLSI circuit of FIG. 3 might be divided into a number of circuit zones with localized phase comparators strategically located between adjacent clock zones.

FIG. 7 is a high-level block diagram illustrating a preferred embodiment of the circuit and method of the present invention. FIG. 7 illustrates how a quadrant of the VLSI circuit 700 might be divided into a number of circuit zones with localized phase comparators 325 strategically located between multiple clock zones. In this way, an organizational structure is provided that allows a methodology for actively deskewing circuit zone clock signals over an entire VLSI circuit. In this regard, a clock reference located at the lower right hand corner of the array of circuit zones may be distributed from the clock reference in the lower right hand corner to a first circuit zone 1, 1. Distribution of a reference clock to circuit zone 1, 1 may be performed using the method described previously in relation to FIG. 3. Alternatively, because circuit zone 1, 1 is adjacent to a clock reference distribution node, the reference clock signal may be applied as the circuit zone clock for circuit zone 1, 1.

Information concerning the relationship between each of the individual circuit zone clocks on the quadrant 700 of the VLSI circuit with the reference clock signal may be distributed as illustrated. In this regard, circuit zone clock comparisons and adjustments may be simultaneously performed between adjacent circuit zones during each clock cycle across the entire VLSI circuit. Each of the arrows associated with a localized phase comparator 325 indicate a circuit zone "referenced" (arrowhead end) from an adjacent circuit zone closer to the clock reference.

The roman numeral label on each of the circuit zones indicates the minimum number of clock adjustment intervals for information from the clock reference to traverse the array. For example, while circuit zone 4, 4's clock signal may be continuously compared with the clock cycle from circuit 4, 3, it will take four comparison and adjustment cycles for information from the clock reference to traverse the individual circuit zones of the quadrant 700. It is important to note that the distribution of localized phase comparators and circuit zone reference choices is just one example of a multitude of distribution schemes consistent with the present invention.

In a preferred embodiment (further illustrated in the flow chart of FIG. 8), circuit zone clock signals from circuit zones 1, 1; 2, 2; and 3, 3 are used as reference clock signals for three adjacent circuit zones. For example, a clock signal from circuit zone 1, 1 serves as a reference clock signal for circuit zones 1, 2; 2, 2; and 2, 1. Similarly, a clock signal from circuit zone 3, 3 would serve as a reference clock signal for circuit zones 3, 4; 4, 4; and 4, 3. Circuit zones that are not along the diagonal formed by circuit zones 1, 1; 2, 2; and 3, 3 may be used as a reference for one adjacent circuit zone further removed from the central clock reference as illustrated.

The comparison and adjustment of adjacent circuit zone clocks described above may be repeated continuously with each clock cycle. Note that while the circuit zone clocks in quadrant 700 of the VLSI circuit are being compared and adjusted, the remaining three quadrants that intersect at the clock reference in the lower right hand corner of the array of circuit zones (if similarly configured) may also be performing the method to deskew synchronous clocks within each of their respective quadrants. It should also be noted that the methodology described above for deskewing synchronous clocks is expandable and not limited to quadrants. Further, it should be noted that FIG. 7 reveals only one possible arrangement of circuit zones and phase comparators 325 in a quadrant 700 of a VLSI circuit. The physical configuration illustrated in FIG. 7 and its companion flow chart (see FIG. 8) arc set forth herein to provide an understanding of the present invention.

Figure 8:
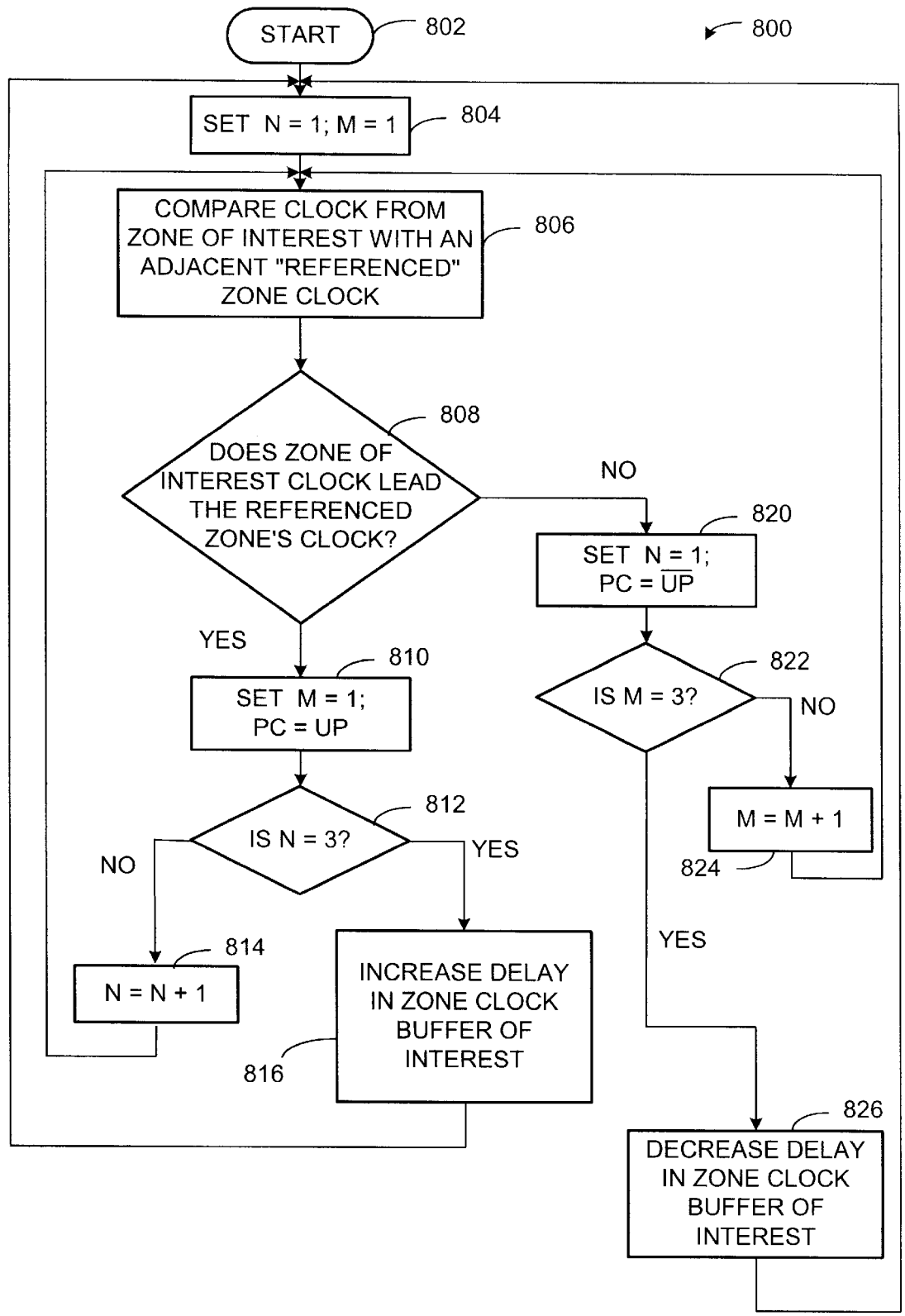
FIG. 8 illustrates a flow chart depicting a possible method of performing clock signal phase comparisons and applying delay adjustments in response thereto consistent with an embodiment of the present invention.

FIG. 8 illustrates a flow chart further describing a method of actively deskewing localized circuit clocks by inserting an adjustable delay in response to measured differences between leading edges of adjacent circuit zone clocks consistent with one embodiment of the present invention. In this regard, the clock signal comparison and skew adjustment method 800 starts at step 802, as illustrated in FIG. 8, designated start. Variables N, and M are initialized in step 804. A phase comparison is performed between the local circuit zone clock signal and an adjacent circuit zone's clock signal using the adjacent circuit zone's clock as the reference for the comparison in step 806. In step 808, if the leading edge of the local clock signal leads the reference clock signal, process flow branches to step 810 where counter M is reinitialized and the phase comparator output signal is set to "up." Next, in step 812, a determination is made if this is the third consecutive "up" signal received from the phase comparator. If the determination in step 812 is "no," then counter N is incremented in step 814 and the process repeats at step 806 for the following clock cycle. If the determination in step 812 is "yes," then step 816 is performed. In step 816, the adjustable delay in the zone clock buffer of interest is increased. The method then repeats by returning to step 804.

If it was determined in step 808 that the clock signal from the circuit zone of interest does not lead the reference, step 820 is performed. In step 820, counter N is reinitialized and the phase comparator Output signal is set to not "up." Next, a determination is made in step 822 if this is the third consecutive not "up" signal received from the phase comparator. If the determination in step 822 is "no," then counter M is incremented in step 824 and the process repeats at step 806 for the following clock cycle. If the determination in step 822 is "yes," then step 826 is performed. In step 826, the adjustable delay in the zone clock buffer of interest is decreased. The method then repeats by returning to step 804.

Figure 9:
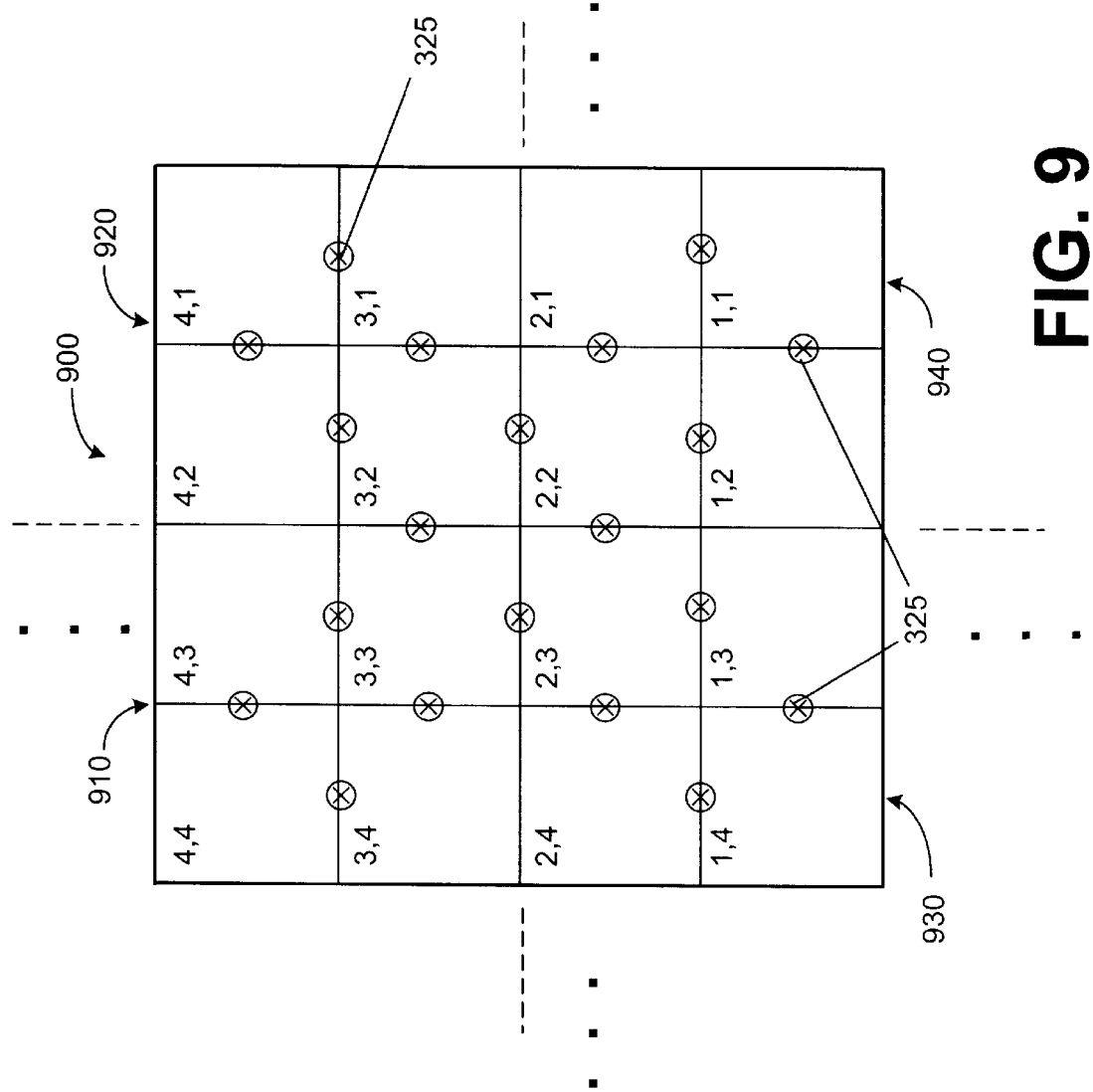
FIG. 9 is a high-level block diagram illustrating how a super-region of the VLSI circuit of FIG. 3 might be divided into a number of circuit zones with additional localized phase comparators (from those depicted with the embodiment illustrated in FIG. 7) strategically located between adjacent clock zones that form the intersection between regions on the VLSI circuit.

Having described a method for deskewing synchronous clocks as illustrated in the flow chart of FIG. 8, reference is now directed to FIG. 9, which depicts a second method of deskewing synchronous circuit zone clocks consistent with the present invention.

FIG. 9 illustrates how a super-region 900 of a VLSI circuit might be divided into a number of circuit zones with localized phase comparators 325 strategically located at clock distribution network nodes common to multiple clock zones (clock distribution network not shown for simplicity). The super-region 900 of the VLSI circuit may be divided into four clock zone regions 910, 920, 930, and 940. Each of the four clock zone regions 910, 920, 930, and 940 comprise four circuit zones with four phase comparators located along the intersections between adjacent clock zones. In addition, four phase comparators are located along the intersections between the four clock zone regions 910, 920, 930, and 940.

In a preferred embodiment, the four additional phase comparators used for regional clock signal comparisons are located along the intersections between circuit zones 3, 3 and 3, 2; 3, 2 and 2, 2; 2, 2 and 2, 3; as well as, the intersection between circuit zones 2, 3 and 3, 3. In this way, an organization is provided that allows a methodology for actively deskewing circuit zone clock signals over an entire VLSI circuit at both an individual circuit zone level and at a regional level.

Unlike the "tree" topology described in association with FIGS. 7 and 8, the physical layout of FIG. 9 provides for "hierarchical" clock signal comparisons. The four circuit zones that intersect at the center of super-region 900 are representative of higher level clock comparisons in that each of circuit zone clocks is compared with two adjacent circuit zone clock signals from circuit zones in the same region, as well as, two adjacent circuit zone clock signals from adjacent regions. For example, circuit zone 3, 3 may be configured such that its zone clock buffer 315 (not shown) receives input signals from four phase comparators. The input signals from the phase comparators at the intersection of circuit zones 4, 3 and 3, 4 will provide relative clock signal information concerning circuit zone 3, 3's clock signal with regards to adjacent circuit zone clocks from clock zone region 910 of which circuit zone 3, 3 is a member. The input signals from the phase comparators at the intersection of circuit zones 3, 2 and 2, 3 will provide relative clock signal information concerning clock zone region 910's clock signal with regards to clock zone regions 920 and 930.

In this regard, the decision logic 335 of zone clock buffer 315 may comprise a majority voter configured to receive the four phase comparator output signals. In this way, decision logic 335 provides a control signal only when a majority of the phase comparators are in agreement as to whether the clock signal in that particular circuit zone leads or lags clock signals from its adjacent circuit zones. In a preferred embodiment, the counter 410 in the zone clock buffer 315 (both not shown) may receive a signal to increment the counter 410 only upon receiving 3 or more phase comparator output signals consistent with increasing the clock buffer delay for the circuit zone of interest. Similarly, the counter 410 may receive a signal to decrement the counter 410 only upon receiving 3 or more phase comparator output signals consistent with decreasing the clock buffer delay for the circuit zone of interest.

Having described circuit zone clock signal comparison and adjustment for the higher level circuit zones that intersect at the center of super-region 900, reference is now directed to the twelve circuit zones that intersect the border of super-region 900. In this regard, the twelve circuit zones that intersect the border of super-region 900 are representative of a lower level clock comparison in that each of the individual circuit zone clock signals are compared with two adjacent circuit zone clock signals from circuit zones within the same clock zone region. Unlike the "tree" topology described in FIGS. 7 and 8 that required four adjustment intervals for information from the clock reference to traverse the array, the "hierarchical" arrangement illustrated in FIG. 9 permits information from each of the circuit zone clocks to traverse the super-region 900 in two adjustment intervals.

It is important to note that the active clock deskewing method described above for synchronous clock signal comparisons and adjustments may be simultaneously performed within a plurality of super-regions during each clock cycle across the entire VLSI circuit. It is important to further note that the distribution of localized phase comparators and circuit zone reference choices as illustrated in FIG. 9 is an example of a multitude of distribution schemes consistent with the present invention. The physical configuration illustrated in FIG. 9 and its companion control flow charts (FIGS. 10A and 10B) are set forth herein to provide an understanding of the present invention. Many variations of circuitry and topology may be implemented consistent with the concept of adjusting a delay element in a localized zone clock buffer to actively deskew clocks across a VLSI circuit. For example, not only can the physical location of phase comparators be modified, but each circuit zone clock zone buffer may be configured to perform the active clock deskewing method for a fixed period of time. In this regard, each clock zone buffer may be configured to perform the method for a predetermined number of clock cycles. Each clock zone buffer at the intersection of VLSI circuit regions may also be modified to progressively shutdown by removing the input phase comparator signals from clock signal phase comparisons performed between clock signals across regions.

Figure 10A:
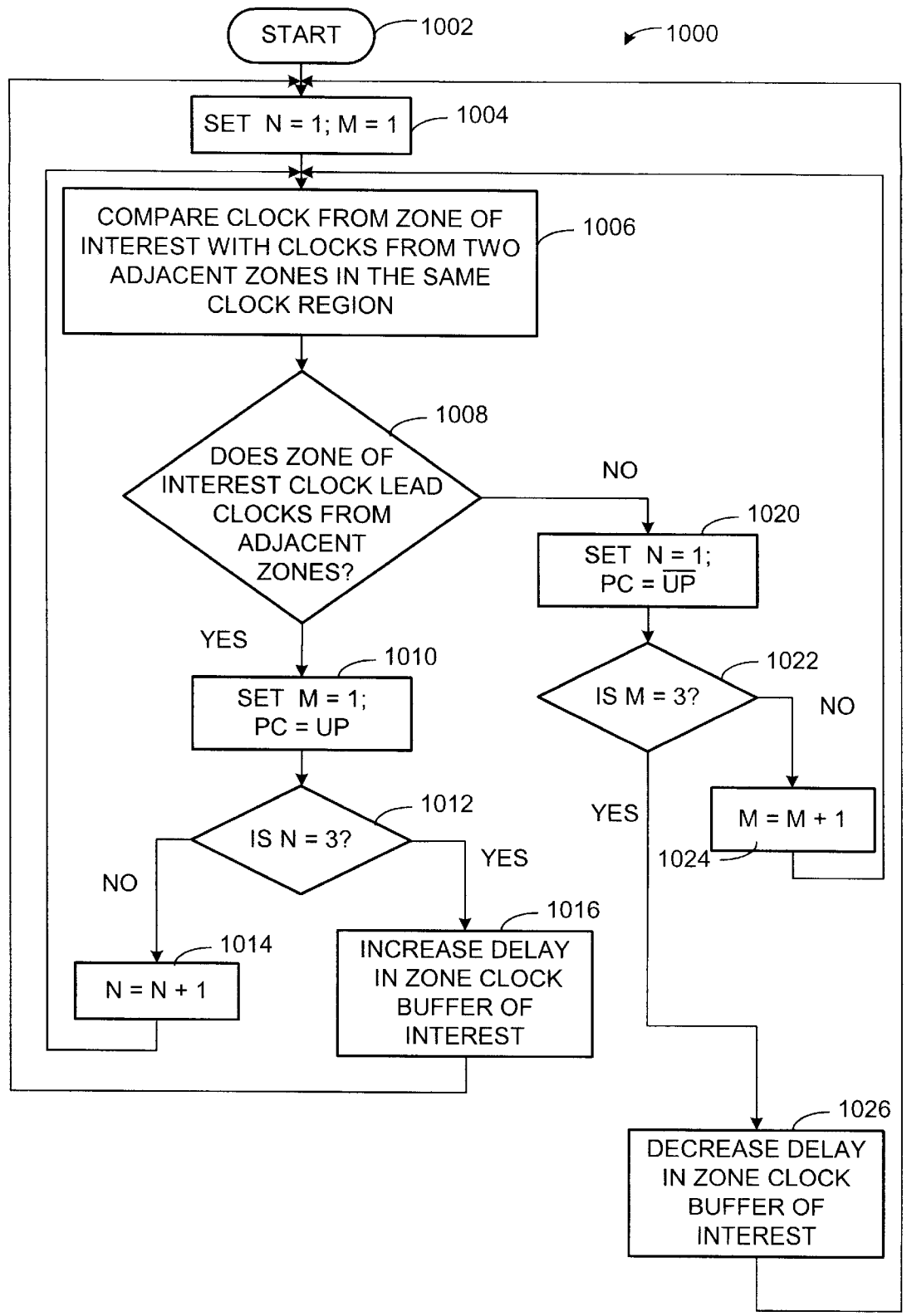
FIG. 10A illustrates a flow chart depicting a possible method of performing clock signal phase comparisons between clocks from two adjacent circuit zones where both clocks belong to the same region and applying delay adjustments in response thereto.
Figure 10B:
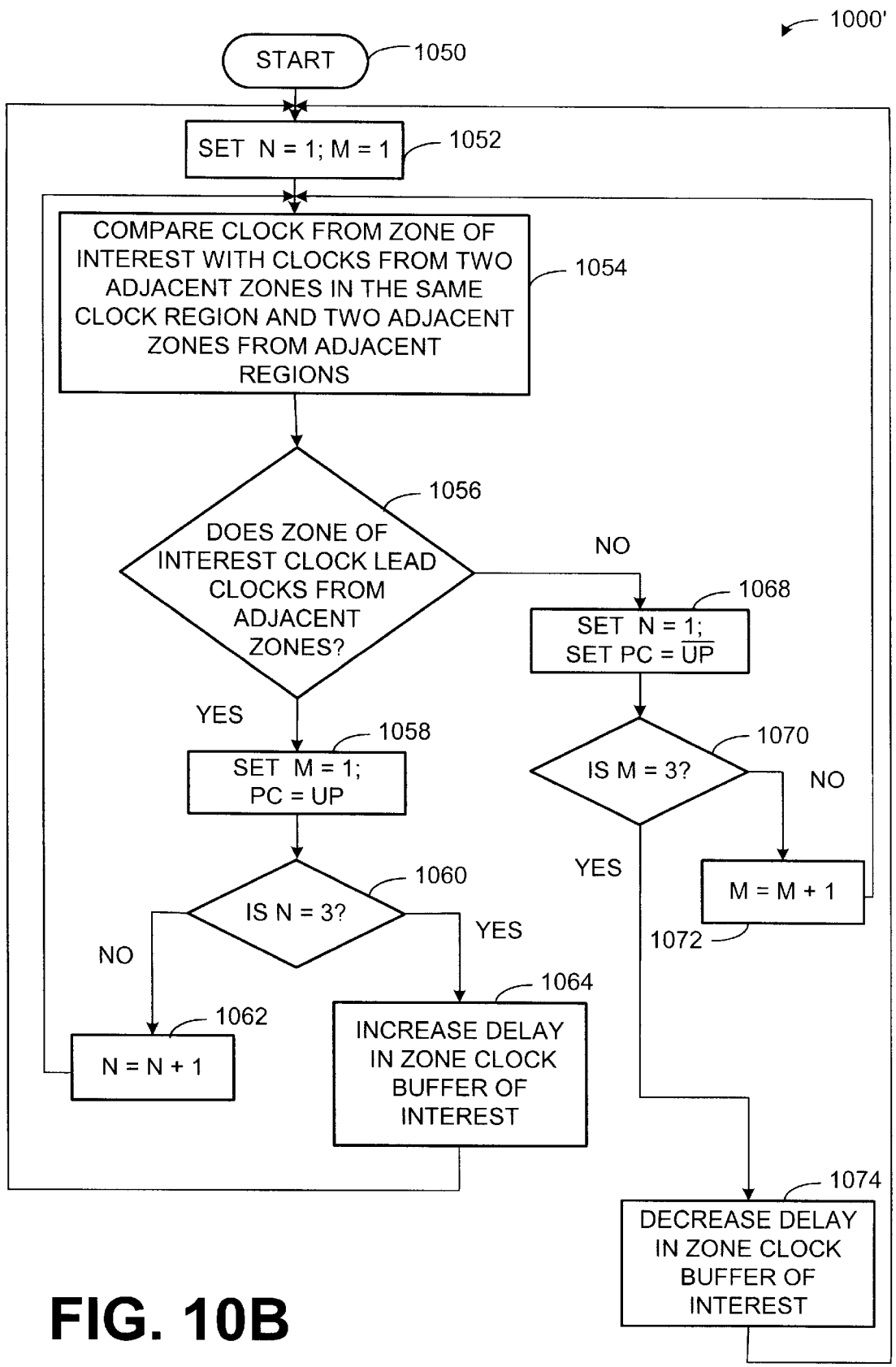
FIG. 10B illustrates a flow chart depicting a possible method of performing clock signal phase comparisons between adjacent circuit zones where the adjacent circuit zones belong to different regions and applying delay adjustments in response thereto.

Having described a methodology for actively deskewing clocks across a VLSI circuit at both a circuit zone region and a super-region level, with regards to FIG. 9, reference is now directed to FIGS. 10A and 10B. FIG. 10A illustrates a flow chart further describing a method of actively deskewing localized circuit clocks by inserting an adjustable delay in response to measured differences between leading edges of adjacent circuit zone clocks consistent with one embodiment of the present invention. With regard to the stricture presented in FIG. 9, the method herein described in FIG. 10A is appropriate for application between the twelve circuit zones that intersect the border of super-region 900 (see FIG. 9).

The clock signal comparison and skew adjustment method 1000 starts at step 1002, as illustrated in FIG. 10A, designated start. Counters N and M are initialized in step 1004. Next, two phase comparisons are performed between the local circuit zone clock signal and two adjacent circuit zone's clock signals from the same clock region in step 1006. In step 1008, if the leading edge of the local clock signal leads both of the adjacent clock signals according to both phase comparators, process flow branches to step 1010 where counter M is reinitialized and a control signal (representing both phase comparisons) is set to "up." Next, in step 1012, a determination is made if this is the third consecutive "up" indication received from the control signal. If the determination in step 1012 is "no," then counter N is incremented in step 1014 and the process repeats at step 1006 for the following clock cycle. If the determination in step 1012 is "yes," then step 1016 is performed. In step 1016, the adjustable delay in the zone clock buffer of interest is increased. The method then repeats by returning to step 1004. It is important to note that if a majority voter is used to translate the phase comparator output signals to the control signal, in those cases where the phase comparator output signals disagree (no majority exists) the majority voter will not output the control signal designated "PC" in step 1010. For these cases, process flow will continue with step 1004 upon the next clock cycle.

If it was determined in step 1008 that the leading edge of the local clock signal lags both of the adjacent clock signals according to both phase comparators, process flow branches to step 1020 where counter N is reinitialized and a control signal (representing both phase comparisons) is set to not "up." Next, a determination is made in step 1022 if this is the third consecutive not "up" indication received from the control signal. If the determination in step 1022 is "no," then counter M is incremented in step 1024 and the process repeats at step 1006 for the following clock cycle. If the determination in step 1022 is "yes," then step 1026 is performed. In step 1026, the adjustable delay in the zone clock buffer of interest is decreased. The method then repeats by returning to step 1004. If a majority voter is used to translate the phase comparator output signals to a control signal, in those cases where the phase comparator output signals disagree (no majority exists) the majority voter will not output the control signal designated "PC" in step 1020. For these cases, process flow will continue with step 1004 upon the next clock cycle.

Having described a method for actively deskewing synchronous clocks for the twelve circuit zones of FIG. 9 that form the border of super-region 900, reference is now directed to FIG. 10B. FIG. 10B illustrates a flow chart further describing a method of actively deskewing localized circuit clocks by inserting an adjustable delay in response to measured differences between leading edges of adjacent circuit zone clocks consistent with one embodiment of the present invention. With regard to the structure presented in FIG. 9, the method herein described in FIG. 10B is appropriate for application between the four circuit zones that intersect at the center of super-region 900 (see FIG. 9).

The clock signal comparison and skew adjustment method 1000' starts at step 1050, as illustrated in FIG. 10B, designated start. Counters N and M are initialized in step 1052. Next, in step 1054, four phase comparisons are performed between the local circuit zone clock signal and four adjacent circuit zone clock signals. Two of the four phase comparisons are with clock signals from circuit zones in the same clock region. The remaining clock signal phase comparisons are with circuit zones from adjacent regions. In step 1056, if the leading edge of the local clock signal leads a majority of the adjacent clock signals according to the four phase comparators, process flow branches to step 1058 where counter M is reinitialized and a control signal (representing the consensus of the four phase comparisons) is set to "up." Next, in step 1060, a determination is made if this is the third consecutive "up" indication received from the control signal. If the determination in step 1060 is "no," then counter N is incremented in step 1062 and the process repeats at step 1054 for the following clock cycle. If the determination in step 1060 is "yes," then step 1064 is performed. In step 1064, the adjustable delay in the zone clock buffer of interest is increased. The method then repeats by returning to step 1052. It is important to note that if a majority voter is used to translate the phase comparator output signals to the control signal, in those cases where the phase comparator output signals disagree (no majority exists) the majority voter will not output the control signal designated "PC" in step 1058. For these cases, process flow will continue with step 1052 upon the next clock cycle.

If it was determined in step 1056 that the leading edge of the local clock signal lags the adjacent clock signals according to the four phase comparators, process flow branches to step 1068 where counter N is reinitialized and a control signal (representing the consensus of four phase comparisons) is set to not "up." Next, a determination is made in step 1070 if this is the third consecutive not "up" indication received from the control signal. If the determination in step 1070 is "no," then counter M is incremented in step 1072 and the process repeats at step 1054 for the following clock cycle. If the determination in step 1070 is "yes," then step 1074 is performed. In step 1074, the adjustable delay in the zone clock buffer of interest is decreased. The method then repeats by returning to step 1052. If a majority voter is used to translate the phase comparator output signals to the control signal, in those cases where the phase comparator output signals disagree (no majority exists) the majority voter will not output the control signal designated "PC" in step 1068. For these cases, process flow will continue with step 1052 upon the next clock cycle.

The flow charts of FIGS. 8, 10A, and 10B show the functionality and operation of methods consistent with the scope of the present invention. In this regard, each block represents a specified logical function(s) that may be implemented by way of elements on the VLSI circuit. It should be noted that in some alternative implementations, the functions noted in the blocks may occur out of the order noted in the FIGS.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An integrated circuit for deskewing a clock signal, comprising:
   a reference clock;
   a clock distribution network configured to route said reference clock to a plurality of nodes, each node in communication with a plurality of regions of the clock distribution network, each region including a plurality of zones, each zone comprising a clock buffer configured to receive the reference clock and to create a zone clock signal corresponding to a respective zone by adjusting said reference clock; and
   a plurality of localized comparators, each comparator in communication with the plurality of clock buffers and configured to generate a control signal responsive to the relative phase of zone clock signals from a circuit zone of interest and a plurality of adjacent circuit zones.

2. The integrated circuit of claim 1, wherein the clock buffer comprises a delay element.

3. The integrated circuit of claim 2, wherein the delay element comprises a counter.

4. The integrated circuit of claim 3, wherein the clock buffer is configured to perform both a coarse and a fine delay adjustment responsive to the control signal.

5. The integrated circuit of claim 4, further comprising a filter, the filter configured to apply said coarse and said fine delay adjustments upon encountering the same control signal for a predetermined number of clock cycles.

6. The integrated circuit of claim 1, wherein the comparators are localized to a plurality of zones that receive the reference clock from a shared clock network node.

7. A very large scale integrated (VLSI) circuit comprising the integrated circuit of claim 1, wherein the zone clock signal for circuit zones adjacent to a node on the clock distribution network serve as a reference clock for adjacent circuit zone clock signal comparisons in zones once removed from the node and wherein subsequent circuit zone clock signal comparisons use a zone clock signal from a circuit zone nearer the node as the reference clock.

8. A very large scale integrated (VLSI) circuit comprising the integrated circuit of claim 1, the clock distribution network, wherein said zone clock buffers are responsive to a plurality of zone clock signal phase comparisons between adjacent circuit zones from at least one other region.

9. The integrated circuit of claim 8, wherein the results from a plurality of circuit zone clock signal comparisons are mathematically combined to determine whether a particular clock zone is leading or lagging adjacent circuit zone clocks within both its own region and adjacent regions.

10. The integrated circuit of claim 9, wherein each zone adjustment is limited to less than the average zone phase difference between each of the compared zones.

11. The integrated circuit of claim 9, wherein clock buffers within circuit zones adjacent to an intersection between regions are configured to receive control signals from at least two zone clock signal phase comparisons performed between their own zone clock signal and clock signals from adjacent zones within the same region and at least two zone clock signal phase comparisons performed between their own zone clock signal and zone clock signals from adjacent circuit zones each of which reside in an adjacent and distinguishable region such that each zone receives a bi-directional flow of control signals.

12. The integrated circuit of claim 11, wherein each clock buffer is configured to progressively remove phase comparison information from at least one zone clock signal from an adjacent region when generating a zone control signal from a zone clock signal comparison performed across regions.

13. An integrated circuit, comprising:
  means for distributing a reference clock to a plurality of nodes, each node in communication with a plurality of regions, each region including a plurality of zones on the circuit;
  means for each of said zones to adjust the reference clock to create a zone clock signal corresponding to a respective zone;
  means for comparing the zone clock signals of a plurality of adjacent zones;
  means for generating a control signal in response to said comparing, wherein the zone clock signal from a zone in closest proximity to a reference clock node is used as a reference for said comparing; and
  means for applying said control signal to said means to adjust said reference clock in each of the plurality of zones, wherein the zone clock signal in each of the respective zones is responsive to the reference clock received within the zone and zone clock signals from a plurality of adjacent zones.

14. The integrated circuit of claim 13, wherein the means for adjusting said reference clock comprises a delay element.

15. The integrated circuit of claim 14, wherein the means for adjusting said reference clock performs a multi-level adjustment.

16. The integrated circuit of claim 15, further comprising means for filtering an input to said delay element, wherein the filtering means applies a delay adjustment after encountering a consistent control signal for a predetermined number of clock cycles.

17. The integrated circuit of claim 13, wherein the means for comparing the zone clock signal phase of a plurality adjacent zones is localized.

18. The integrated circuit of claim 13, wherein the means for generating a control signal is responsive to a plurality of clock signal phase comparisons performed between a first zone clock signal and a plurality of adjacent zone clock signals, wherein the results from the plurality of clock signal phase comparisons are mathematically combined to determine if a particular clock zone is leading or lagging adjacent circuit zone clock signals.

19. The integrated circuit of claim 18, wherein the means for applying said control signal adjusts each zone delay element by less than an average phase difference between each of the compared zones.

20. The integrated circuit of claim 18, wherein the means for generating a control signal receives a bidirectional flow of clock zone comparison results.

21. The integrated circuit of claim 18, wherein the means for generating a control signal progressively removes at least one zone clock signal from an adjacent zone when determining whether a particular zone's clock signal leads or lags zone clock signals from adjacent zones.

22. A method for controlling synchronous clock distribution on a very large scale integrated (VLSI) circuit, comprising the steps of:
  providing a reference clock to each of a plurality of nodes, each node in communication with a plurality of regions of a clock distribution network, each region including a plurality of zones in said circuit;
  supplying each of said zones with a clock buffer configured to provide a zone clock signal;
  comparing the phase of a plurality of zone clock signals from adjacent zones to create a control signal;
  adjusting the clock buffer within a zone of interest in response to the control signal; and
  repeating the steps of comparing and adjusting such that each zone clock signal is responsive to a bi-directional flow of control signals.

23. The method of claim 22, further comprising the steps of:
  performing a plurality of zone clock signal phase comparisons both within and across regions; and
  generating a control signal in response to said zone clock signal phase comparisons.

24. The method of claim 23, further comprising the step of:
  filtering said control signal wherein the step of applying the delay element is performed after receiving the same control signal level for a predetermined number of clock cycles.

* * * * *